United States Patent
Kinoshita

(10) Patent No.: US 6,419,328 B1
(45) Date of Patent: Jul. 16, 2002

(54) SIDE BRAKE DEVICE ACTIVATING DESPITE FAILURE TO APPLY

(76) Inventor: Toyoku Kinoshita, 5-14, Choda 3-chome, Higashiosaka City, Osaka, 577-0056 (JP)

(*) Notice: Subject to any disclaimer, the term of this patent is extended or adjusted under 35 U.S.C. 154(b) by 0 days.

(21) Appl. No.: 09/582,520
(22) PCT Filed: Mar. 29, 1999
(86) PCT No.: PCT/JP99/01632
§ 371 (c)(1), (2), (4) Date: Jun. 22, 2000
(87) PCT Pub. No.: WO99/51474
PCT Pub. Date: Oct. 14, 1999

(30) Foreign Application Priority Data

Apr. 2, 1998 (JP) .......................... 10-108658

(51) Int. Cl.[7] ................................. B60T 7/08
(52) U.S. Cl. ...................... 303/6.1; 188/2 D
(58) Field of Search .............. 188/2 D; 303/6.1; 180/271, 286

(56) References Cited

U.S. PATENT DOCUMENTS 3,743,047 A * 7/1973 Dapolito .................. 180/286

FOREIGN PATENT DOCUMENTS

JP 64-14557 * 1/1981
JP 5-178174 * 7/1993

* cited by examiner

*Primary Examiner*—Matthew C. Graham
(74) *Attorney, Agent, or Firm*—Curtis L. Harrington

(57) ABSTRACT

A side brake device, wherein a pivot of a lever (5) is pivotally supported rotatably on a fixed plate (3) located at an operator's seat side, a side brake wire (2) is fixed to one end of the lever and the one end of an elastic body (7) is fixed to the other end of it, the lever is energized by the elastic body so that it is always rotated in the direction to apply a side brake by pulling the side brake wire, a side brake lever (1) is installed so that it can be rotated by a fixed amount relative to the lever, a wire (10) is passed from one end of the side brake through the other end of the lever to an appropriate position of a door, and the lever is rotated downward against the energizing force of the elastic body so as to loosen the side brake wire and release the side brake, the lever is held by a holding means at the lever releasing position, holding by the holding means is released by the opening of the door or upward manual rotating operation of the side brake lever, and the lever is rotated in the direction that the side brake wire is tensed by the energizing force of the elastic body so as to firmly apply the side brake, whereby the side brake can be applied even by itself or the opening of the door.

1 Claim, 9 Drawing Sheets

SIDE BRAKE DEVICE ACTIVATING DESPITE FAILURE TO APPLY

TECHNICAL FIELD OF THE INVENTION

The present invention relates to a side brake device which activates despite failure to apply, and the purpose thereof is to provide a side brake device which can prevent not only accidents occurred due to an operator fails to apply a side brake, but also accidents occurred due to a side brake not being applied properly.

BACKGROUND ART

Generally speaking, a side brake (parking brake) device used for cars is constructed so that it brakes due to a brake cable being pulled by a side brake lever set on an operator's sheet side being pulled upward by an operator.

However, with the existing side brake devices, unless an operator intentionally pulls a side brake upward, a brake cable will not be pulled, thus, in a case of an operator carelessly forgets a pull-up operation of a side brake, it results in a condition wherein a side brake is not applied, causing a risk of big accidents occured by a car running recklessly.

As for an art which takes consideration of such actual circumstances, there is a Japanese patent publication, Jitsukaisho 64-14557, for example.

A device disclosed in this Japanese Jitsukaisho 64-14557 comprises a cable means which connects a side brake lever and a door by a drive, and together with an opening movement of the door, it moves a side brake to a direction to which a brake being firmly applied.

With this disclosed art, together with the opening of the door, the side brake lever can be rotated into the direction to which a brake being firmly applied, thus, the side brake can be applied by an open-close operation of the door when an operator gets off the car, and although this art is outstanding in a way that it can lower the risk of accidents which occur due to a failure of applying the brake, there is a grave defect described in the below.

That is, since this disclosed art is such wherein the opening of the door and the upward rotation of the side brake are simply geared, the condition of the brake is geared to the opening of the door. For example, when a lady who is small gets off a car without opening a door very widely, an upward rotation of a side brake gets smaller, thus, it is dangerous because it leads to a condition where the brake is not well applied.

Unfortunately indeed, there is no end to accidents occurred due to a failure of applying a side brake, and many people die in such accidents each year.

Within such accidents occurred due to a failure of applying a side brake, apart from accidents due to a complete failure to apply a side brake, there are many accidents occurred due to a failure to pull a side brake properly.

Referring to such actual circumstance, in Japan Tokkaihei 5-178174, the inventor of this patent application has already invented a side brake device which can be applied automatically with a movement of a door in spite of how much the door is open, by continually energizing a side brake lever into a direction to which a brake being firmly applied with an elastic body, and has been successful in solving the above mentioned problems.

However, with such side brake device, there are still problems left, that is, if the elasticity of the elastic body gets insufficient, the elasticity cannot be assisted by an action of an operator, and moreover, if it is a condition wherein the door is closed, an operator cannot pull up the side brake lever by oneself.

So, the present inventor has continued a further devoted study, and has come to be successful in inventing a side brake device which enables to completely apply the brake either by a manual operation or by an opening movement of a door, and can completely prevent not only accidents occurred due to an operator fails to apply the side brake, but also accidents occurred due to the side brake not being applied properly.

DISCLOSURE OF THE INVENTION

The present invention is a side brake device, wherein a pivot of a lever is pivotally supported rotatably on a fixed plate located at an operator's seat side, a side brake wire is fixed to one end of said lever and the one end of an elastic body is fixed to the other end thereof, the lever is energized by said elastic body so that it is always rotated in the direction to apply a side brake by pulling the side brake wire, a side brake lever is installed so that it can be rotated by a fixed amount to which a fitting pin of a holding means can be taken off by an upward rotation, relative to the lever, a wire is passed from one end of said side brake lever through the other end of said lever to an appropriate position of a door at where the side brake lever can be rotated upward due to the wire being pulled by the opening of the door, and the lever is rotated downward against the energizing force of the elastic body so as to loosen the side brake wire and release the side brake, the lever is held by a holding means at the lever releasing position, holding by said holding means is released by the opening of the door or upward manual rotating operation of the side brake lever, and the lever is rotated in the direction that the side brake wire is tensed by the energizing force of said elastic body so as to firmly apply the side brake, and it relates to a side brake device wherein said holding means is installed at one end of said lever with one end passing through lower end of a vertical portion of the side brake lever, the other end comprising the fitting pin fit into a fitting concave portion provided on the fixed plate, upward rotation of the pivot is impeded due to the fitting pin being fit into the fitting concave portion, and the fitting pin is made to separate from the fitting concave portion by upward rotation of the side brake lever.

DESCRIPTION OF PREFERRED EMBODIMENTS OF THE INVENTION

The following is to explain preferred embodiments of the side brake device activating despite failure to apply set forth in the present invention, with a reference made to the drawings.

Figure 1:
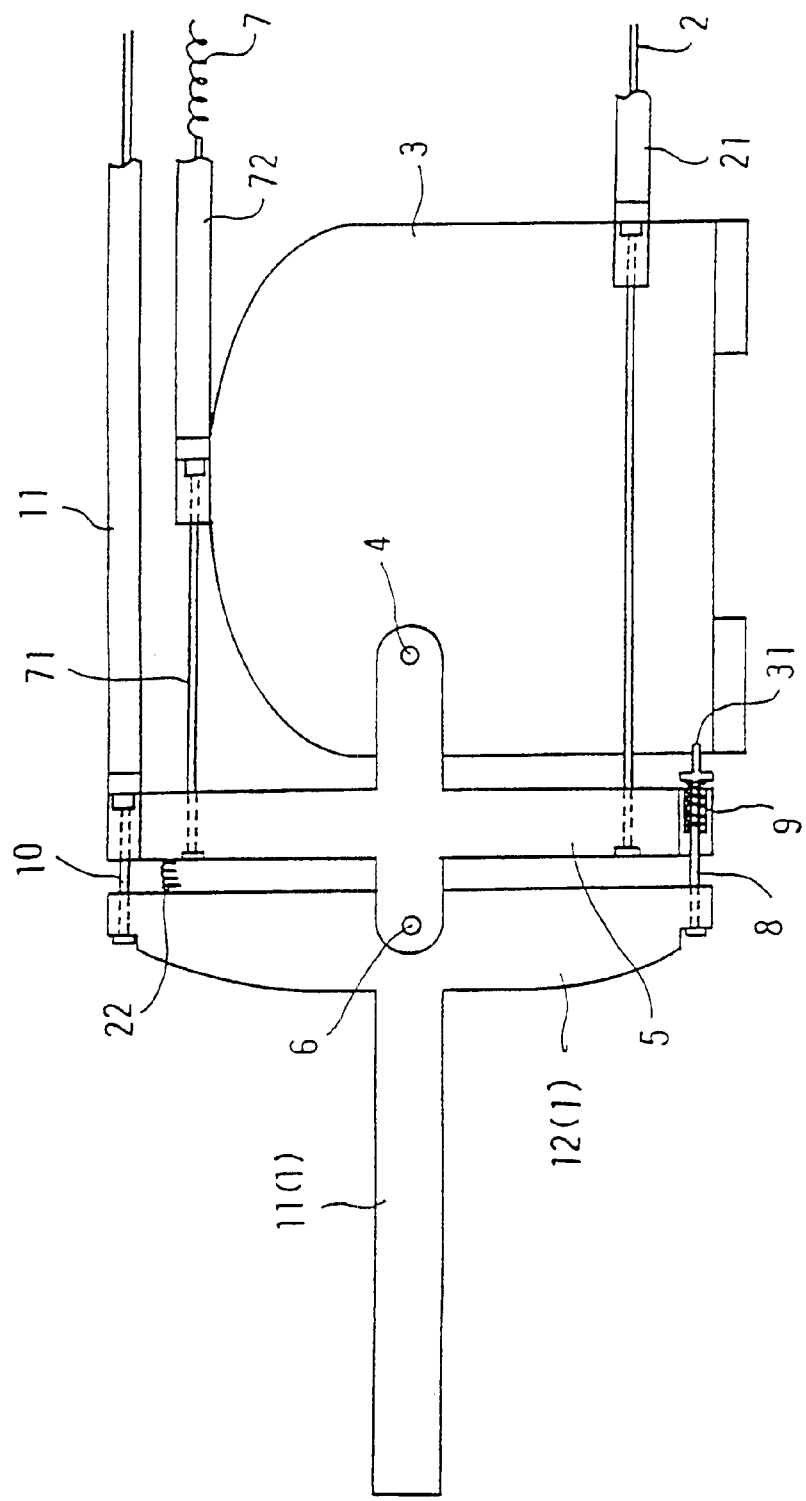
FIG. 1 is a schematic structural illustration showing a released condition of a brake of a side brake device set forth in the first embodiment of the present invention.
Figure 2:
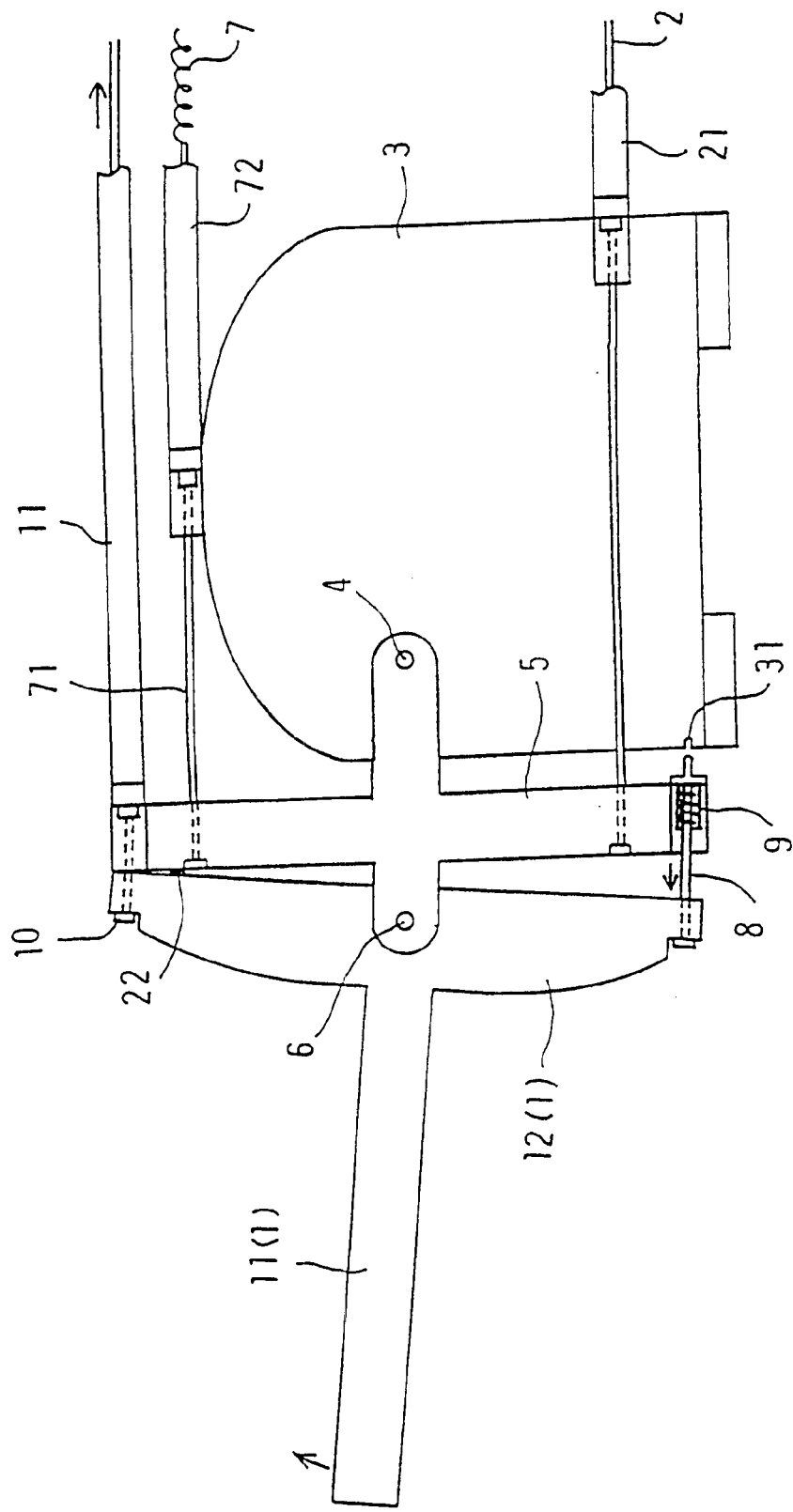
FIG. 2 is a schematic structural illustration wherein the brake is tried to be applied within the side brake device set forth in the first embodiment.
Figure 3:
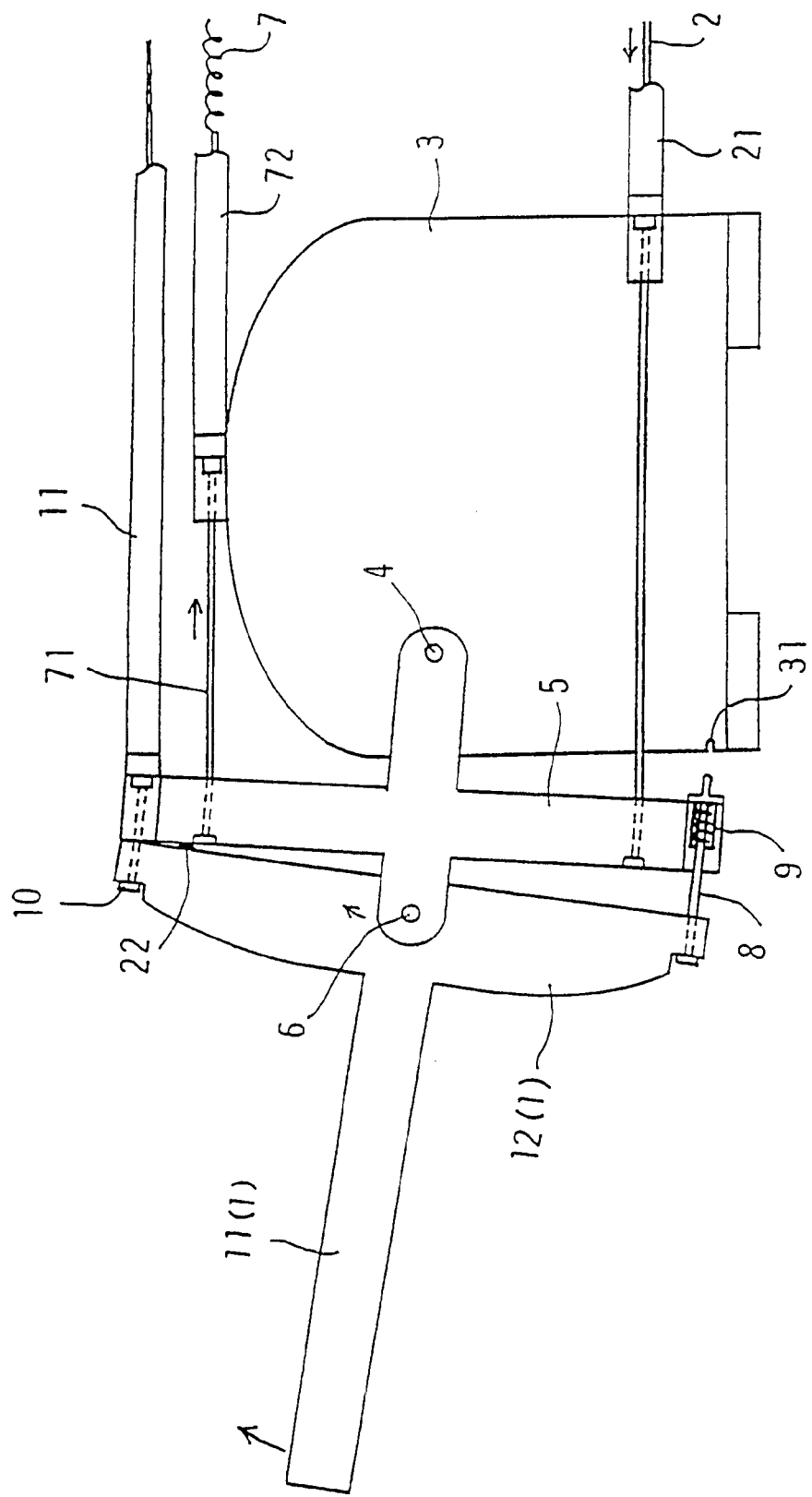
FIG. 3 is a schematic structural illustration of tensed condition of the brake of the side brake device set forth in the first embodiment.

FIG. 1 is a schematic structural illustration showing a released condition of a brake of a side brake device set forth in the first embodiment of the present invention, FIG. 2 is a schematic structural illustration wherein the brake is tried to be applied within the side brake device set forth in the first embodiment, and FIG. 3 is a schematic structural illustration of tensed condition of the brake of the side brake device set forth in the first embodiment.

The side brake device set forth in the present invention is constructed so that a side brake (not being shown in the drawings) can be firmly applied by rotating upward a side brake lever 1 either by a manual operation or by an opening movement of a door.

The side brake device set forth in the first embodiment comprises a fixed plate 3 fixed to an operator's seat side of a car, a lever 5 pivotally supported rotatably on this fixed plate 3 by a pin 4, a side brake lever 1 which is pivotally supported on the lever 5 by a pin 6 in order to rotate by a fixed amount relative to the lever 5, and a side brake wire 2 which firmly applies or releases the brake by a rotation of the lever 5 caused by an up-down rotating operation of the side brake lever 1.

With the pin 4 as a pivot, the lever 5 has one end thereof being fixed to the side brake wire 2 and the other end thereof is fixed to one end of an elastic body 7 comprised of a strong spring.

The elastic body 7 continually pulls the other end of the lever 5, and by doing this, upward rotating force of the lever 5 against the fixed plate 3, i.e., toward a direction to which the side brake wire 2 is tensed, is energized.

Additionally, the illustrated example has a structure wherein a wire 71 is installed to a pointed end of the elastic body 7 and a pointed end of the wire 71 is fixed to the lever 5. Also, the wire 71 is covered with a cable cover 72 in order to protect the wire from snapping off, and a pointed end of the cable cover 72 is fixed to the top portion of the fixed plate 3.

Further, the side brake wire 2 fixed to one end of the lever 5 is also covered with the cable cover 21, and a pointed end of the cable cover 21 is fixed to the top portion of the fixed plate 3.

Looking from the side, the side brake lever 1 pivotally supported by a pin to the lever 5 is set to be almost in a T-shape comprising a horizontal portion 11 which extends out to the operator's seat side and a vertical portion 12 set vertically to this horizontal portion 11, and the vertical portion 12 set in a shape of a cross is installed thereto with some space in between a vertical portion of the lever 5.

A passed through fitting pin 8 is installed to one end of the lever 5, and one end portion thereof is inserted to a lower portion of the vertical portion 12 of the side brake lever 1 and the other end portion thereof is fit by a fitting concave portion 31 of the fixed plate 3. Also, on one end portion of the fitting pin 8, a stopper is formed and prevents the fitting pin 8 from completely slipping out of the side brake. This fitting pin 8 is continually energized in a direction of fitting, i.e., a direction toward the fixed plate 3, by the spring 9 embedded in the other end of the pivot 5.

Also, a spring 22 is set in between near an top end of the vertical portion 12 of the side brake lever 1 and the lever 5. This spring 22 energizes the top end of the vertical portion 12 of the side brake lever 1 in a direction to separate from the lever 5, acting as to certainly fit the fitting pin 8 to the fitting concave portion 31 when the brake is released.

The fitting pin 8 acts as to keep the brake released by stopping the lever 5 to rotate upward (in a clockwise direction). And, when applying the brake, if the fitting pin 8 is taken off from the fitting concave portion 31 of the fixed plate 3 by slightly rotating the side brake lever 1 upward as shown in FIG. 2, the lever 5 rotates upward with an energizing force of the elastic body 7, and the side brake wire 2 gets pulled in order for the side brake to be applied automatically.

Hence, the space between the vertical portion 12 of the side brake lever 1 and the vertical portion of the lever 5 can be as small as for the fitting pin 8 to be taken off by the upward (a clockwise direction) rotation of the side brake lever 1.

One end of a wire 10 is fixed to the top end of the vertical portion 12 of the side brake lever 1, and a pointed end of a cable cover 11 covering this wire 10 is fixed to the other end of the lever 5.

Also, the other end of the wire 10 is connected to a suitable position on the open-close door. It is constructed so that the side brake lever 1 rotates upward due to the wire 10 being pulled by opening the door and the fitting pin 8 is taken off from the fitting concave portion 31 of the fixed plate 3 so as to apply side brake.

Figure 4:
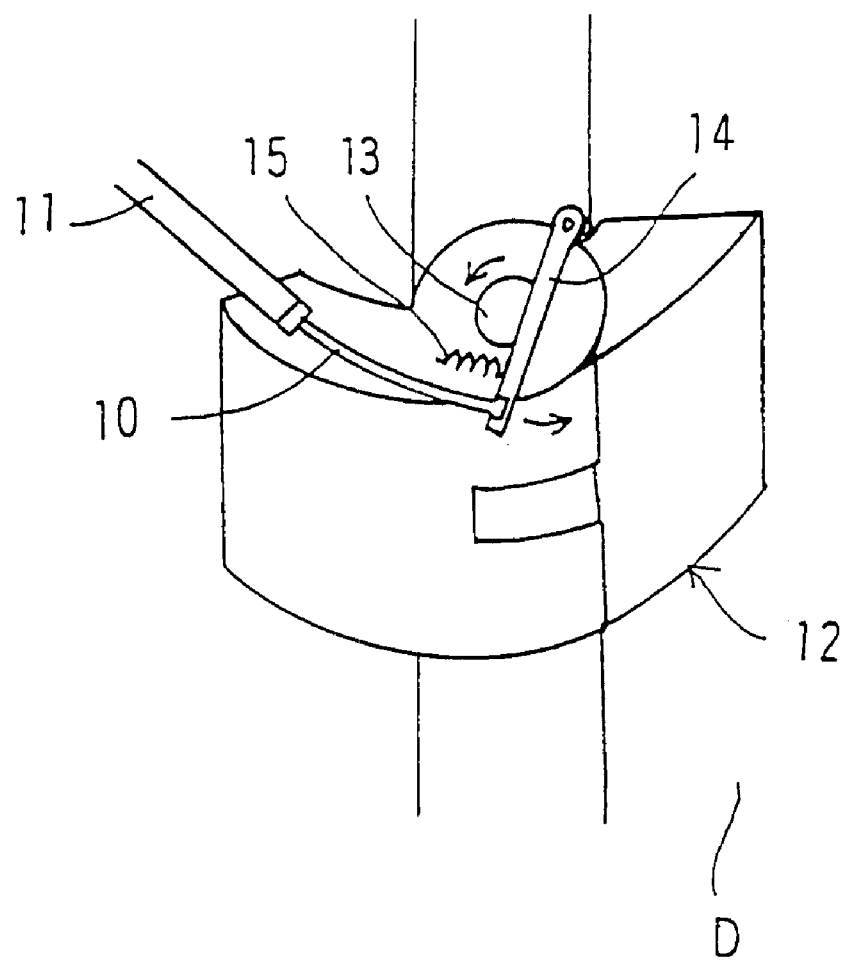
FIG. 4 is a schematic illustration showing an example of how to connect a wire to an open-close door of the side brake device set forth in the present invention.

Additionally, the fixing position on the open-close door of the wire 10 is not particularly restricted, unless it is possible to take off the fitting pin 8 from the fitting concave portion 31 of the fixed plate 3 by rotating the side brake lever 1 upward by an opening operation of the door, but it is preferable to attach the wire at a position of a hinge 12 of a door D, as shown in FIG. 4.

More concretely speaking of the structure of FIG. 4, a rod body 14 is rotatably attached to a center pin 13 of the hinge 12 of which sectional surface is in a half-moon shape, and a wire 10 is fixed on a pointed end of the rod body 14. Further, the rod body 14 is continually energized toward the center pin 13 by a spring 15.

Thereupon, together with the opening of the door, the center pin 13 rotates in a direction of an arrow, followed by the rod body 14 which rotates in the direction of the arrow, pulling the wire 10, whereby the side brake can be applied by the opening of the door.

The following is to explain actions of the side brake device with the above mentioned structure, referring to FIGS. 1 to 3.

Normally, when driving a car, the side brake lever 1 is put down against energizing force of the elastic body 7, as shown in FIG. 1. At this time, the door is naturally closed, thus, the side brake lever 1 will not be pulled by the wire 10.

Under such condition, since the fitting pin 8 is fit into the fitting concave portion 31 of the fixed plate 3, the upward rotation of lever 5 is impeded, thus, the side brake wire 2 becomes loose.

Under this condition, the side brake is not applied, and wheels of a car can run, thus it is possible to drive the car, and while running a car, the side brake device is in this condition.

When a person who drives the car stops the car to park, if the open-close door is open, the wire 10 attached to the open-close door at one end thereof get pulled at the same time as the open-close door is opened, rotating the side brake lever 1 upward as shown in FIG. 2.

Then, together with the upward rotation of the side brake lever 1, the fitting pin 8 is pulled out from the fitting concave portion 31.

Due to this separation of the fitting pin 8, the condition of lever 5 being impeded to rotate is released, and as shown in FIG. 3, the lever 5 is rotated clockwise by the energizing force of the elastic body 7, and thus, the side brake wire 2 is pulled by this rotation so that the side brake gets tensed.

As a result of the above actions, even if an operator carelessly forgets a pull-up operation of a side brake, the side brake gets in a condition of being automatically pulled up by an open-close movement of the open-close door, stopping a reckless run of a car.

Further, the opening of the open-close door works like a trigger for pulling the side brake in a way, thus, regardless how much the door is opened, that is, even when a lady who is small gets off a car without opening a door very widely, it is possible to create a condition wherein the side brake is automatically and completely applied by the open movement of the door by itself.

Also, in the same way as in the past, the fitting pin 8 can easily be pulled out from the fitting concave portion 31 by an operator rotating upward the side brake lever 1 by oneself, so that the side brake can be applied without opening a door.

On the other hand, when releasing the side brake in the condition of FIG. 3, the side brake lever 1 is to be push down against the energizing force of the elastic body 7 so that the fitting pin 8 is fit into the fitting concave portion 31 of the fixed plate 3.

Thereupon, it becomes to be in the condition of FIG. 1 wherein the rotation of the lever 5 is impeded, so that the side brake wire 2 gets loosen and the side brake gets released.

Then, this condition is kept by the fitting pin 8 being fit into the fitting concave portion 31 of the fixed plate 3.

Therefore, an operator can drive and run a car in this condition.

In said first embodiment, a structure for manually releasing a side brake is shown, further in the present invention, it is possible to make it as a structure of the side brake which automatically release itself, and this structure as the second embodiment is explained hereinafter.

Figure 5:
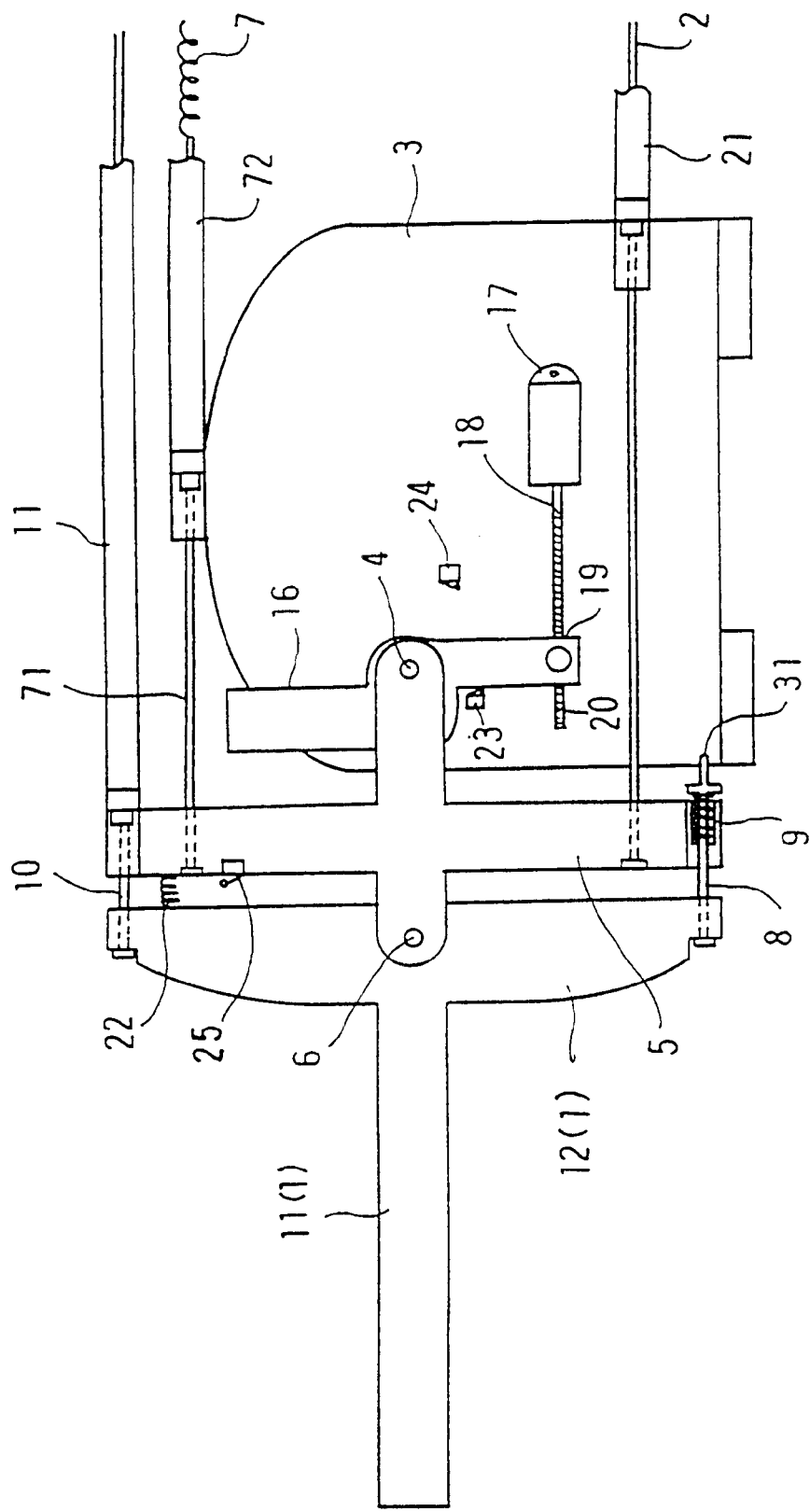
FIG. 5 is a schematic structural illustration showing a released condition of a brake of a side brake device set forth in the second embodiment of the present invention.
Figure 6:
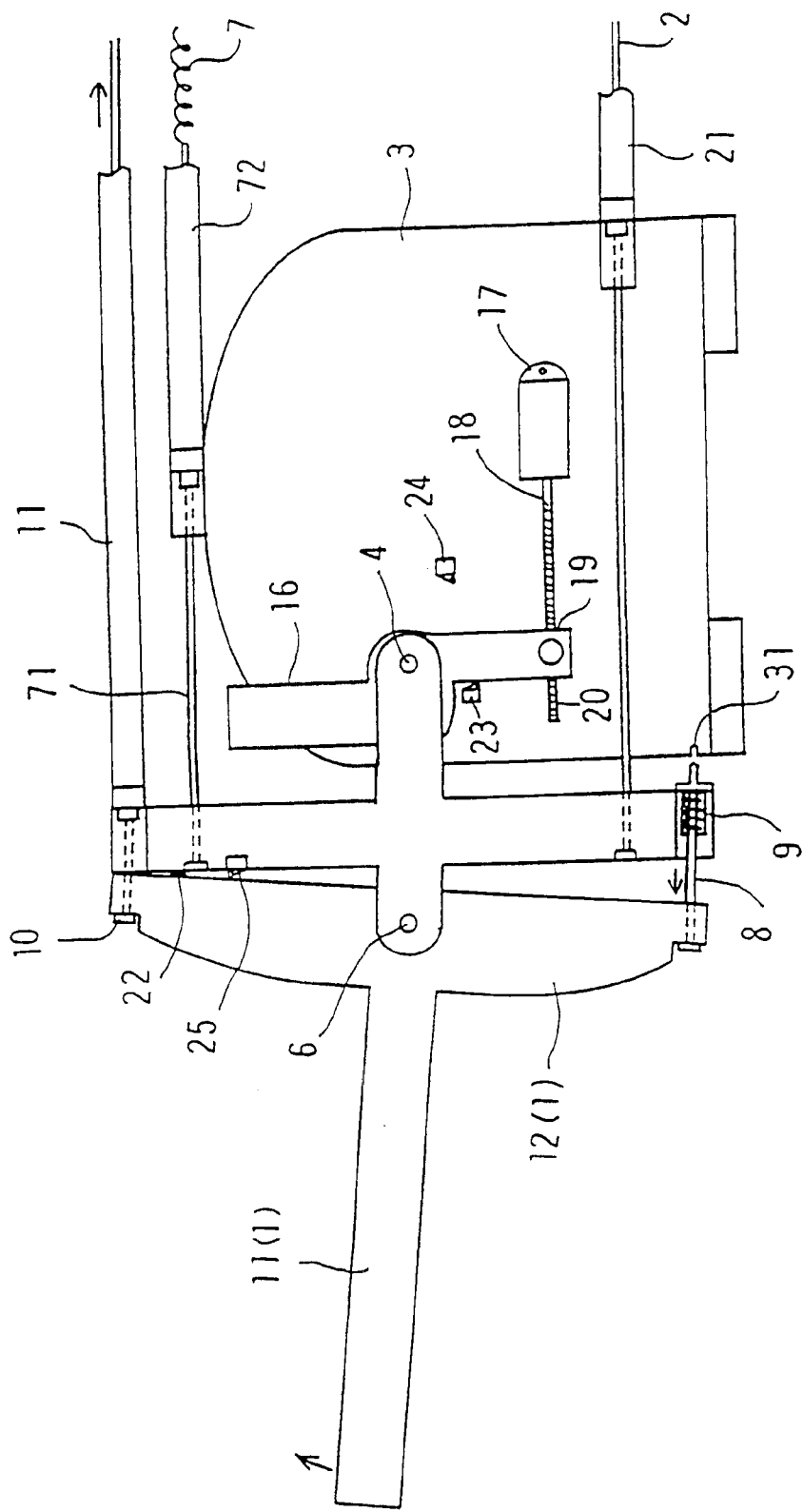
FIG. 6 is a schematic structural illustration wherein the brake is tried to be applied within the side brake device set forth in the second embodiment.
Figure 7:
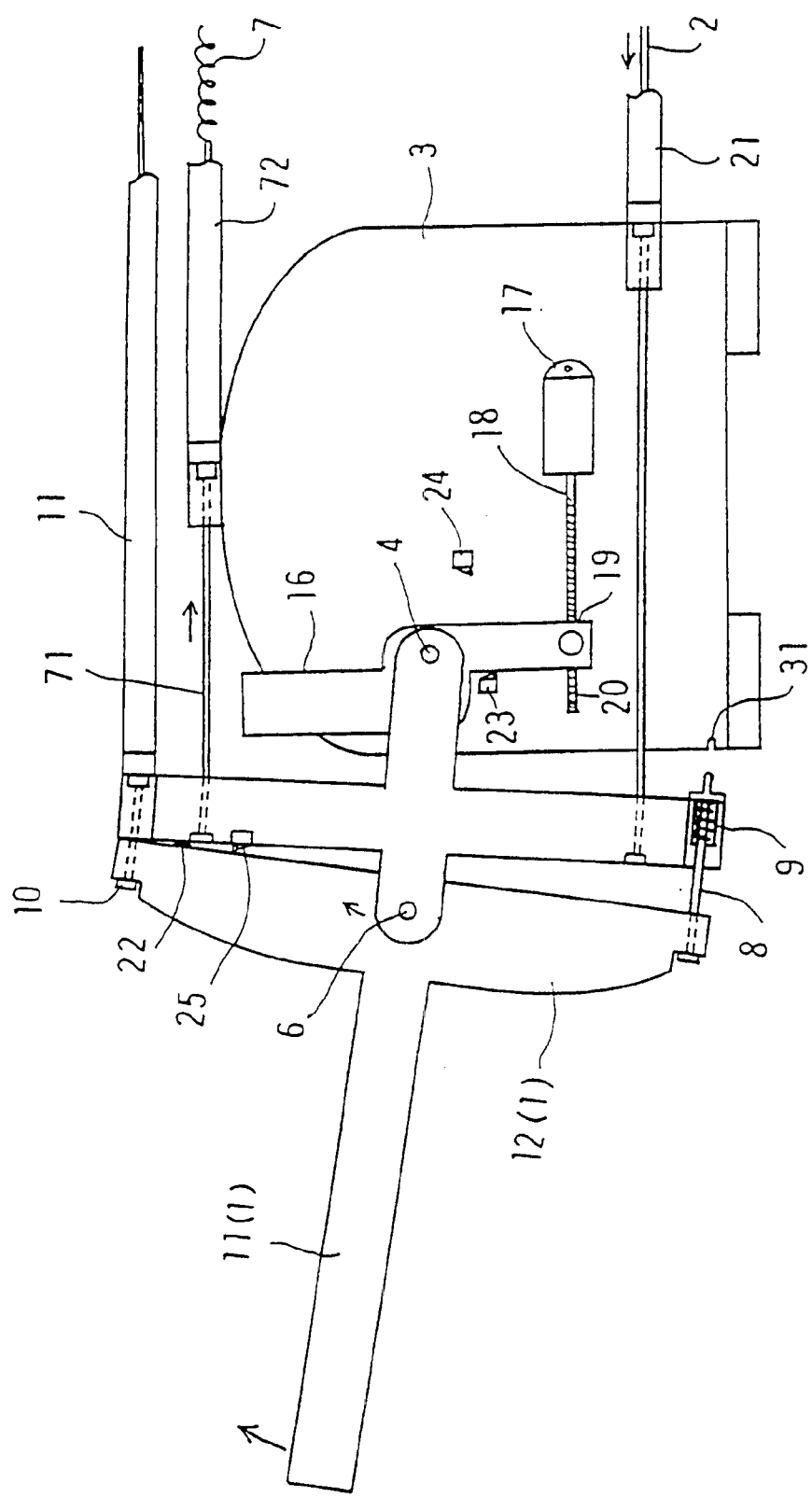
FIG. 7 is a schematic structural illustration of tensed condition of the brake of the side brake device set forth in the second embodiment.
Figure 8:
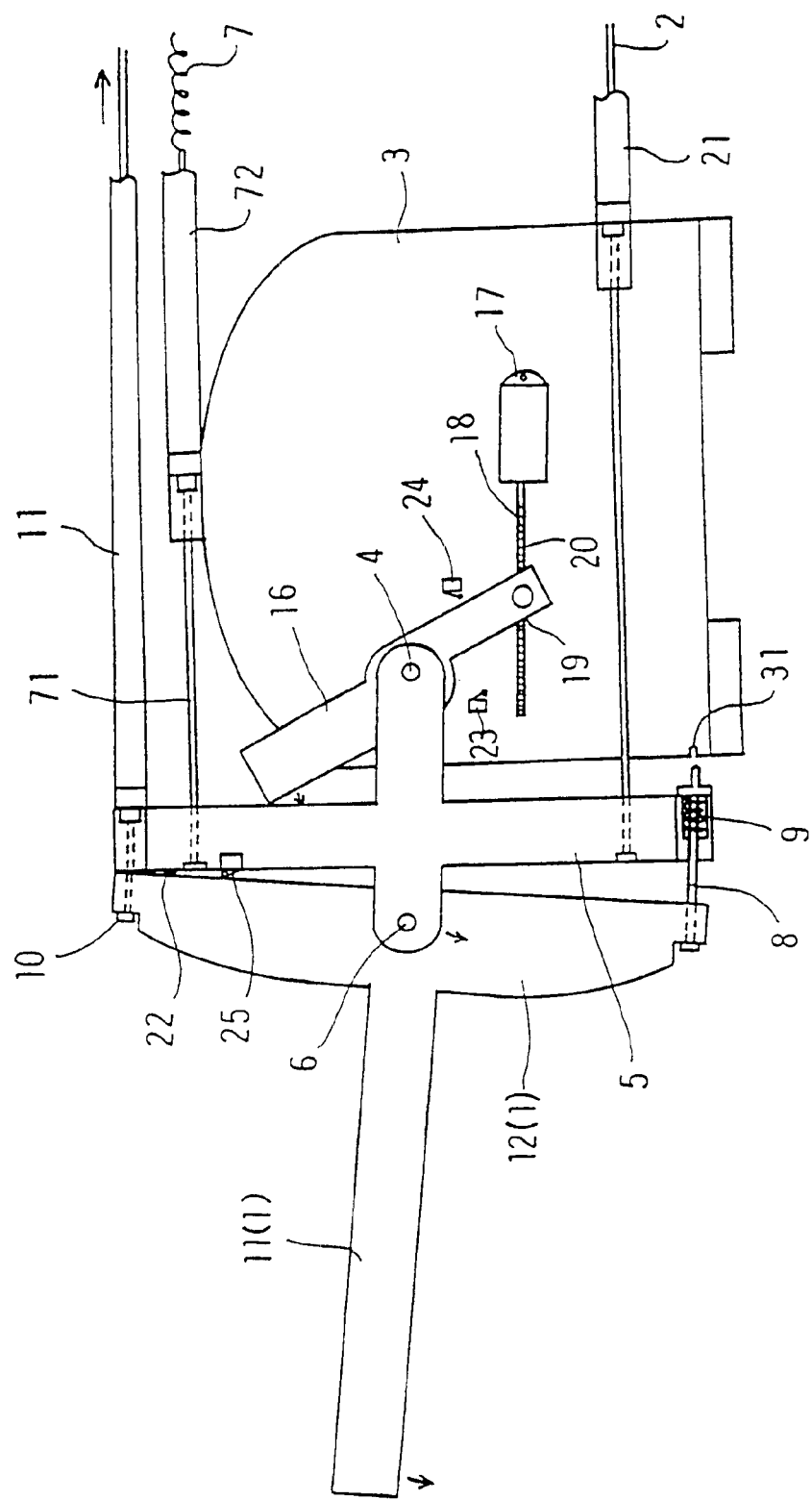
FIG. 8 is a schematic structural illustration showing an action of the side brake device set forth in the second embodiment when the brake is released.
Figure 9:
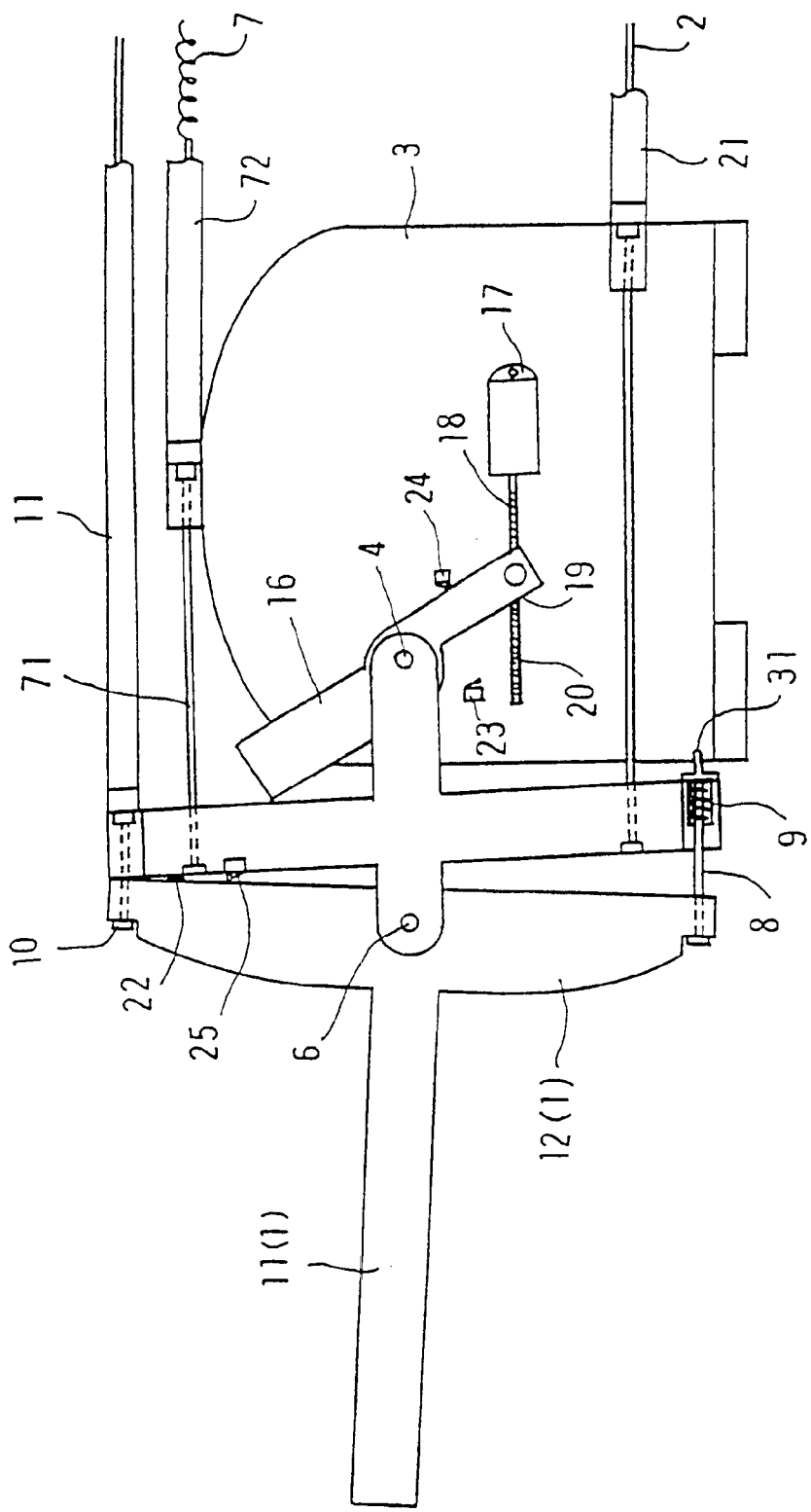
FIG. 9 is a schematic structural illustration showing an action of the side brake device set forth in the second embodiment when the brake is released.

FIG. 5 is a schematic structural illustration showing a released condition of a brake of a side brake device set forth in the second embodiment of the present invention, FIG. 6 is a schematic structural illustration wherein the brake is tried to be applied within the side brake device set forth in the second embodiment, and FIG. 7 is a schematic structural illustration of tensed condition of the brake of the side brake device set forth in the second embodiment. Also, FIG. 8 and FIG. 9 are schematic structural illustrations showing actions of the side brake device set forth in the second embodiment when the brake is released.

A basic structure of a brake device set forth in the second embodiment is the same as that of the first embodiment, thus, the same portions are numbered in the same way and explanations thereof will be omitted, and the following is to explain mainly the structures of the second embodiment which are different to that of the first embodiment.

With the brake device set forth in the second embodiment, a pry 16 is installed on the same pivot as a lever 5 at a portion pivotally supported on a fixed plate 3 of the lever 5, and an internal thread 19 is formed at a lower end of this pry 16.

And, a external thread 20 formed on a revolving shaft 18 of a motor 17 which is driven by a gearing with an engine switch is engaged.

There is a spring 22 which is set in between a side brake lever 1 and the lever 5 and is continually energizing a top portion of the side brake lever 1 in a direction to separate from the lever 5.

Also, on a fixed plate 2, a motor 17 for left rotating (anti-clockwise rotation) and right rotating (clockwise rotation) the pry 16 by an engaging of the internal thread 19 and external thread 20, and limit switches 23 and 24 for finding a stopping position and a reverse rotating position of this pry 16 are installed.

Additionally, the motor 17 is restricted so that it cannot move back and forward (i.e., the directions toward right and left in the drawings).

The following is to explain the actions of the side brake device comprising the above mentioned structures with a reference made to FIGS. 5 to 9.

Normally, when driving a car, the side brake lever 1 is put down against energizing force of the elastic body 7, as shown in FIG. 5. At this time, the door is naturally closed, thus, the side brake lever 1 will not be pulled by the wire 10.

Under such condition, since the fitting pin 8 is fit into the fitting concave portion 31 of the fixed plate 3, the upward rotation of lever 5 is impeded, thus, the side brake wire 2 becomes loose.

Under this condition, the side brake is not applied, and wheels of the car can run, thus it is possible to drive the car, and while running the car, the side brake device is in this condition.

When a person who drives the car stops the car to park, if the open-close door is open, the wire 10 attached to the open-close door at one end thereof get pulled at the same time as the open-close door is opened, rotating the side brake lever 1 upward as shown in FIG. 6.

Then, together with the upward rotation of the side brake lever 1, the fitting pin 8 is pulled out from the fitting concave portion 31.

Due to this separation of the fitting pin 8, the condition of lever 5 being impeded to rotate is released, and as shown in FIG. 7, the lever 5 is rotated clockwise by the energizing force of the elastic body 7, and thus, the side brake wire 2 is pulled by this rotation so that the side brake gets tensed.

As a result of the above actions, even if an operator carelessly forgets a pull-up operation of a side brake, the side brake gets in a condition of being automatically pulled up by an open-close movement of the open-close door, stopping a reckless run of the car.

Further, the opening of the open-close door works like a trigger for pulling the side brake in a way, thus, regardless how much the door is opened, that is, even when a lady who is small gets off a car without opening a door very widely, it is possible to create a condition wherein the side brake is automatically and completely applied by the open movement of the door by itself.

Also, in the same way as in the past, the fitting pin 8 can easily be pulled out from the fitting concave portion 31 by an operator rotating upward the side brake lever 1 by oneself, so that the side brake can be applied without opening a door.

On the other hand, when starting a car by releasing a side brake in the condition of FIG. 7, putting a switch on for actuating the motor 17 and rotating clockwise the pry 16 by rotating the revolving shaft 18 makes the top portion of the pry 16 hit the lever 5 as shown in FIG. 8, so the lever 5 and the side brake lever 1 rotate clockwise.

Then, as shown in FIG. 9, when the fitting pin 8 comes into the position to fit into the fitting concave portion 31 of the fixed plate, the limit switch 24 becomes on and switches the electric circulation to reverse the rotation of the motor 17.

As the result, the pry 16 returns by rotating clockwise, but at this time, an upward rotation of the lever 5 is impeded by a fitting of the fitting pin 8 to the fitting concave portion 31, so the condition wherein the side brake is released will be kept.

The pry 16 returns back to the position of limit switch 23 (the condition shown in FIG. 5) by clockwise rotating as it is, and the limit switch 23 comes on and the electric circulation switches to stop actuating motor 17.

Thus, the operator can drive and run a car with this condition.

However, when the pry 16 rotates clockwise, the lever 5 is pulled by actuating the motor 17, thus, it will be in a condition wherein the side brake cannot be applied. Hereupon, in order to prevent such condition, it is preferred to construct a structure wherein the limit switch 25 is set on the top portion of the lever 5 as shown in the figures, for detecting the clockwise rotation of a side brake lever 11 to reverse the motor 17.

Additionally, in this second embodiment, it can take a structure wherein using a cylinder instead of the motor 17, the pry 16 is rotated by a reciprocating motion of a cylinder rod.

In accordance with the side brake device set forth in the second embodiment, the side brake can be automatically released by gearing to an starting of a starter motor. When driving a car, the starter motor never fails to be started, thus, there is no necessary operation for releasing a side brake by an operator.

However, actuating the motor 17 and the starting of the starter motor are not necessarily be geared, thus, it can take a structure wherein the motor 17 is actuated by a switch operation different to that of the starter motor.

Further, the side brake device set forth in the second embodiment has other outstanding effects.

Since the side brake device set forth in the present invention is energized in the direction wherein the side brake lever 1 always goes up by the elastic body 7 comprising a strong spring, a big force is necessary for manually pushing the side brake lever 1 down against the force of the spring.

As for light cars, such strong force of spring is not necessary for firmly applying a side brake, thus, it is not inconvenient to comprise the structure wherein the side brake lever 1 is manually push down like shown in the first embodiment, but as for large-size cars such as trucks, strong force of spring is necessary for firmly apply a side brake, thus, there might be a case wherein a side brake lever 1 cannot be push down against the force of the spring.

In such case, if a structure wherein a side brake lever 1 is push down by a mechanical force like shown in the second embodiment is taken, it becomes possible to release a side brake easily, even for large-size cars such as trucks.

Furthermore, the examples shown are those which show schematic structures of the side brake device set forth in the present invention, thus, shapes and sizes of each parts and displacing positions thereof can be changed within the scope wherein the above mentioned actions work, as one wishes.

Industrial Applicability

As explained in the above, the side brake device set forth in the present invention can be widely used for any types of motor vehicles including light cars and large-size cars, as a side brake device of motor vehicle having a preventing function of failure to apply.

What is claimed is:

1. A side brake device wherein a pivot of a lever (5) is pivotally supported rotatably on a fixed plate (3) located at an operators seat side, a side brake wire (2) is fixed to one end of said lever and the one end of an elastic body (7) is fixed to the other end thereof, the lever is energized by said elastic body so that it is always rotated in the direction to apply a side brake by pulling the side brake wire, a side brake lever (1) is installed so that it can be rotated by a fixed amount to which a fitting pin (8) of a holding means can be pulled out by an upward rotation, relative to the lever, a door wire (10) is passed from one end of said side brake lever through the other end of said lever to a position on a door at where the side brake lever can be rotated upward due to the door wire being pulled by the opening of the door, and the lever is rotated downward against the energizing force of the elastic body so as to loosen the side brake wire and release the side brake, the lever is held by a holding means at the lever releasing position, holding by said holding means is released by the opening of the door or upward manual rotating operation of the side brake lever, and the lever is rotated in the direction that the side brake wire is tensed by the energizing force of said elastic body so as to firmly apply the side brake, relating to a side brake device wherein said holding means is installed at one end of said lever with one end passing through a lower end of a vertical portion (12) of the side brake lever, the other end comprising the fitting pin fit into a fitting concave portion (31) provided on the fixed plate, upward rotation of the pivot is impeded due to the fitting pin being fit into the fitting concave portion, and the fitting pin is made to separate from the fitting concave portion by upward rotation of the side brake lever.

\* \* \* \* \*